United States Patent
McCormick

(10) Patent No.: US 10,883,626 B2
(45) Date of Patent: Jan. 5, 2021

(54) VALVE TRIM APPARATUS FOR USE WITH CONTROL VALVES

(71) Applicant: Fisher Controls International LLC, Marshalltown, IA (US)

(72) Inventor: Nathan Samuel McCormick, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 182 days.

(21) Appl. No.: 16/022,224

(22) Filed: Jun. 28, 2018

(65) Prior Publication Data

US 2020/0003334 A1 Jan. 2, 2020

(51) Int. Cl.
*F16K 47/08* (2006.01)
*F16K 1/52* (2006.01)

(52) U.S. Cl.
CPC ............... *F16K 47/08* (2013.01); *F16K 1/52* (2013.01)

(58) Field of Classification Search
CPC . F16K 47/08; F16K 1/52; F16K 3/246; F16K 47/02; F16K 47/023; F16K 1/32
See application file for complete search history.

(56) References Cited

U.S. PATENT DOCUMENTS

| | | | |
|---|---|---|---|
| 3,791,413 A * | 2/1974 | Muller | F16K 47/04 137/625.3 |
| 4,671,321 A | 6/1987 | Paetzel et al. | |
| 7,152,628 B2 * | 12/2006 | Folk | F16K 25/04 137/625.3 |
| 9,587,764 B2 * | 3/2017 | Juhnke | F16K 3/34 |
| 2017/0184219 A1 | 6/2017 | Braeuer | |
| 2018/0112800 A1 | 4/2018 | Griffin, Jr. et al. | |

FOREIGN PATENT DOCUMENTS

| | | |
|---|---|---|
| DE | 102004037831 A1 | 3/2006 |
| WO | 2001069114 A1 | 9/2001 |
| WO | 2017018173 A1 | 2/2017 |

OTHER PUBLICATIONS

International Searching Authority, "International Search Report," dated Oct. 10, 2019 in connection with International Patent Application No. PCT/US2019/036314, 5 pages.
International Searching Authority, "Written Opinion," dated Oct. 10, 2019 in connection with International Patent Application No. PCT/US2019/036314, 10 pages.

* cited by examiner

*Primary Examiner* — Eric Keasel
(74) *Attorney, Agent, or Firm* — Hanley, Flight & Zimmerman, LLC

(57) ABSTRACT

Valve trim apparatus for use with fluid valves are disclosed. An example apparatus includes a cage to be positioned in a fluid flow passageway of a valve body. The cage having a first end and a second end opposite the first end. The cage including columns extending between the first end and the second end at an angle relative to a primary fluid flow path of the cage. Each of the columns includes fluid flow passageways extending through the column from an outer peripheral surface of the column to an interior surface of the column. The columns are radially spaced about a circumference of the cage body to define fluid flow passageways between the columns.

20 Claims, 5 Drawing Sheets

US 10,883,626 B2

1

VALVE TRIM APPARATUS FOR USE WITH CONTROL VALVES

FIELD OF THE DISCLOSURE

This disclosure relates generally to process control systems and, more particularly, to valve trim apparatus for use with control valves.

BACKGROUND

Process control systems like those used in the oil and gas production industry, refining, petrochemical and other processing plants typically include significant equipment assets, such as pumps. The condition, health, integrity, and/or performance of such pumps are essential to the efficiency and/or safety of processing plants.

SUMMARY

An example apparatus includes a cage to be positioned in a fluid flow passageway of a valve body. The cage having a first end and a second end opposite the first end. The cage includes columns extending between the first end and the second end at an angle relative to a primary fluid flow path of the cage. Each of the columns includes fluid flow passageways extending through the column from an outer peripheral surface of the column to an interior surface of the column. The columns are radially spaced about a circumference of the cage body to define fluid flow passageways between the columns.

An example apparatus includes a fluid valve body. The example apparatus also includes a cage disposed in the fluid valve body. The cage has a first end and a second end opposite the first end. Elongated openings in the cage extend between the first end and the second end. The openings are radially spaced and non-parallel to a longitudinal axis of the cage. Each of the elongated openings provides a fluid flow path between an interior of the cage and an exterior of the cage.

An example apparatus includes means for defining a fluid flow passageway between an inlet and an outlet. The example apparatus also includes means for modulating fluid flow between the inlet and the outlet. The means for modulating fluid flow is angled relative to a primary fluid flow path of the means for defining the fluid flow passageway.

DETAILED DESCRIPTION

Figure 1:
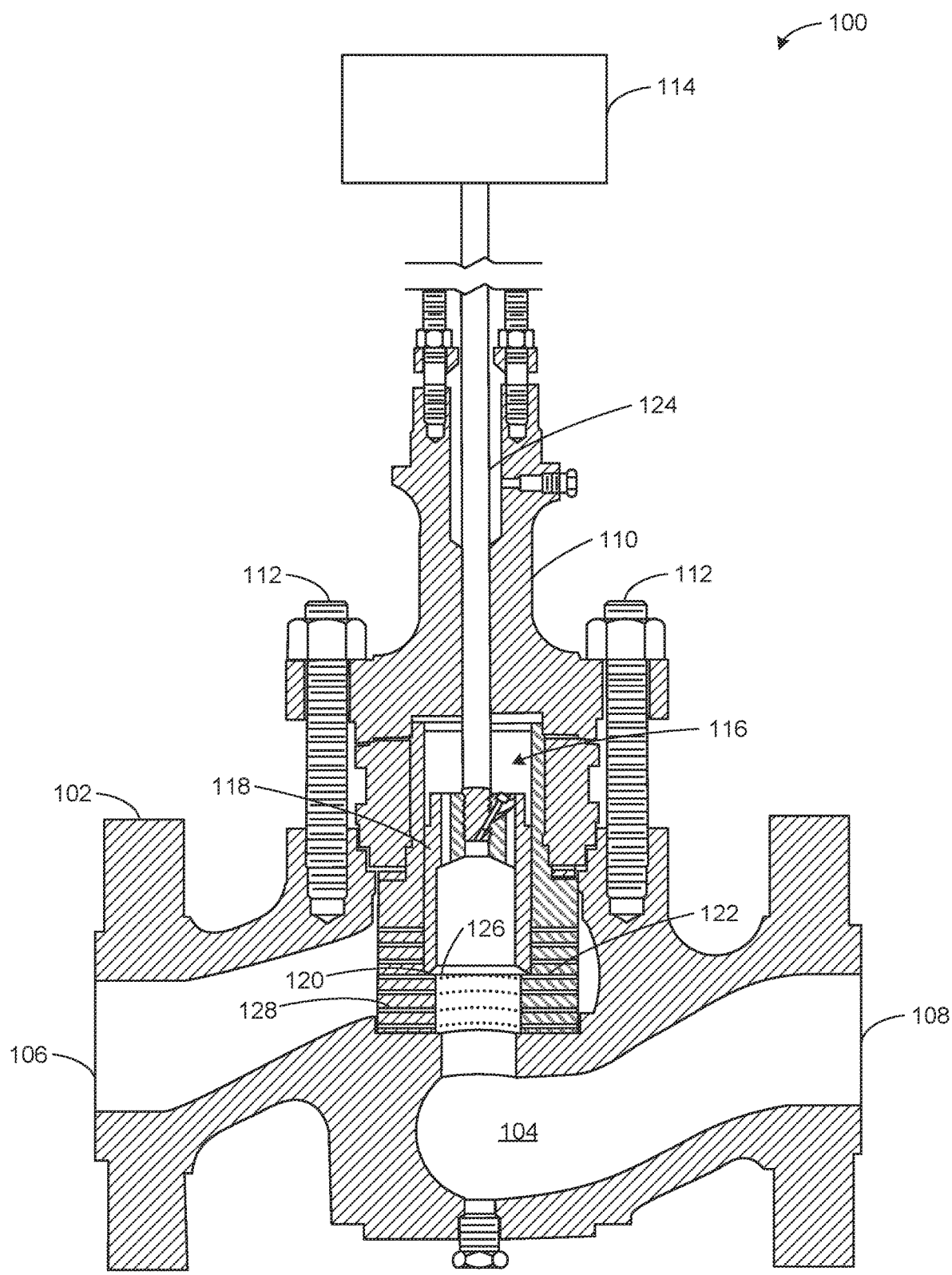
FIG. 1 is a cross-sectional view of a known control valve.

Cavitation is one of the leading causes of pump failure. Cavitation occurs in pumps (e.g., centrifugal pumps) when there is insufficient pressure within the pump casing to maintain a fluid in a liquid state and/or when a liquid is subjected to rapid pressure changes that cause the formation of cavities in the liquid where the pressure is relatively low.

2

When the fluid within a pump is unable to maintain a liquid state, vapor pockets and/or small bodies of gas contained in the liquid (e.g., bubbles) form within the pump. When subjected to high pressure, the vapor pockets can implode and generate an intense shock wave, which can damage components of the pump. For example, cavitation can erode material from the impeller, wear the pump housing and/or seal, and/or cause pumps seals to leak. Such damage to components of the pump can result in a failure of the pump.

Cavitation can be caused by continued operation of a pump below a particular flow rate (e.g., a minimum flow rate). Thus, to protect an upstream liquid pump from cavitation and/or overheating, a continuous (e.g., minimum) flow rate is required. To provide a continuous flow rate, some process control systems employ a separate recirculation pipeline. The recirculation pipeline provides fluid to an inlet of the pump from an exit of the pump. Thus, when downstream demand decreases, the recirculation pipeline provides the pump a continuous flow of liquid to reduce or prevent cavitation and/or overheating. However, the recirculation pipeline increases costs and maintenance and, in some instances, space restrictions prevent installation of a recirculation pipeline.

To eliminate the recirculation pipeline, some known process control systems employ a rotary valve (e.g., a butterfly control valve) having a disc or flow control member that includes apertures (e.g., holes formed through the disc) to support a continuous minimum flow rate through a pump positioned upstream from the rotary valve. For example, when downstream demand decreases, the rotary valve can be positioned to a closed position. However, the apertures in the disc enable a certain amount of fluid flow between an inlet and an outlet (e.g., through the disc) of the rotary valve to provide a continuous (e.g., minimum) flow rate through the control valve to prevent cavitation in the upstream pump. Although such known rotary valves are effective for preventing cavitation in the pump, such known rotary valves have limited pressure drop capability or characteristics and the apertures in the disc can become clogged with particles or debris. As a result, such known rotary valves cannot be used with high pressure applications due to concerns with high pressure liquid cavitation. For example, cavitation can decrease flow capability through the control valve (e.g., choked flow), can cause material damage to valve trim, a valve body, and/or pipeline, and/or can cause excessive noise and/or vibration. Thus, such rotary valves are only effective for low pressure drop applications (e.g., pressure drops of less than 50 psi).

Many known process control and/or fluid distribution systems (e.g., power generation systems, petroleum refinery systems, etc.) employ pressure regulators to control flow rates and/or pressures of various fluids (e.g., liquids, gases, etc.). Fluid regulators are utilized within process control and/or fluid distribution systems to reduce and/or regulate a fluid pressure to a substantially constant value.

For example, known pressure regulators include an inlet that receives fluid from a source at a relatively high pressure and an outlet that provides fluid to downstream equipment at a relatively lower pressure than that of the inlet. The inlet pressure of some known pressure regulators is reduced to a lower outlet pressure by restricting flow through an orifice to match downstream demand. For example, known pressure regulators of process control and/or fluid distribution systems receive fluid (e.g., gas, liquid) having a relatively high and somewhat variable pressure from an upstream source and regulate the fluid flow to reduce and/or stabilize the pressure to a level suitable for use by downstream equipment (e.g., equipment of a power generator, a petroleum refiner, etc.).

In some instances, the pressure regulators produce a substantial decrease in pressure or flow rate of the fluid which, in turn, creates a significant amount of audible noise (e.g., greater than about 85 decibels). Pressure regulators may employ noise-reduction devices to reduce the volume of audible noise created by the fluid flowing through the pressure regulator.

Some noise-reduction devices are fluid pressure-reduction devices that include special internal fluid structures (e.g., filters, springs, etc.) to induce pressure drops. In some examples, fluid pressure-reduction devices include a series of spaced-apart plates and/or discs that incrementally reduce pressure (e.g., by a discrete amount, by a percentage of the previous fluid pressure) along a flow path of the pressure regulators. The pressure drops induced by the plates result in a corresponding reduction or attenuation in noise of the pressure regulators (e.g., by a discrete decibel level, by a percentage of the decibel level otherwise produced by the pressure regulator). In some examples, fluid flowing through the fluid pressure-reduction device applies a force on peripheral portions of the plates that causes the peripheral portions to bend, deflect, rotate and/or otherwise move away from a wall of the fluid passageway (e.g., in a downstream direction), thereby reducing an amount of noise attenuation provided by the plates.

Example valve trim apparatus disclosed herein employ example valve trim apparatus (e.g., noise attenuators) in a fluid passageway to maintain an amount of noise attenuation. The example apparatus reduces unacceptable high noise levels produced by regulators (e.g., pressure regulators) in fluid communication with the example apparatus to more acceptable low noise levels (e.g., less than about 85 decibels).

Furthermore, example valve trim apparatus disclosed herein enable control valves to provide continuous flow characteristics for pump systems. For example, fluid control valves disclosed herein employ example valve trim apparatus that provide continuous (e.g., a minimum flow rate to prevent overheating and/or cavitation damage to an upstream pump. Specifically, example valve trim apparatus disclosed herein eliminate the need for a recirculation pipeline. Additionally, example fluid control valves implemented with example valve trim apparatus disclosed herein can be employed in relatively high pressure drop applications (e.g., pressure drops of 3,000 psi). Example fluid control valves implemented with example valve trim apparatus disclosed herein can reduce a potential for high pressure liquid cavitation. To provide a continuous minimum) flow rate for the upstream pump, reduce high pressure liquid cavitation and/or mitigate particles from impinging on the valve trim, example valve trim apparatus disclosed herein employ a cage having radially spaced columns positioned between a first end and a second end of the cage. Specifically, the cage and the columns enable fluid flow between an inlet and an outlet of a valve.

Additionally, example cages disclosed herein can include one or more apertures to provide desired fluid flow characteristics such as, for example, enhanced pressure recovery, reduction or elimination of noise and/or cavitation, etc. For example, pressure recovery is a flow characteristic of a fluid passageway that indicates an amount and/or percentage increase in fluid pressure after a preceding decrease in fluid pressure. In examples in which a valve cage can produce a low pressure recovery, fluid pressure downstream from a throat of a passageway can be significantly less than fluid pressure upstream from the throat. Low pressure recoveries and/or reduced fluid pressure can result in other undesired fluid flow characteristics such as, for example, cavitation and/or reduced noise attenuation. For example, if a fluid passageway includes a throat (e.g., a narrowed portion of the fluid passageway between two wider portions of the fluid passageway), the fluid pressure decreases as the fluid approaches the throat and increases as the fluid exits the throat. In such instances, the pressure recovery identifies the increase in fluid pressure from the throat (e.g., a lowest-pressure value) to the subsequent wider portion (e.g., a highest-pressure value downstream from the throat). The desired fluid flow characteristics (e.g., enhanced pressure recovery, reduction of noise and/or cavitation, etc. are achieved by varying a number and/or a geometry of the apertures.

FIG. 1 is a cross-sectional view of a known control valve 100. The control valve 100 of the illustrated example is a sliding stem valve. The control valve 100 of the illustrated example includes means for defining a fluid flow passageway 104 between an inlet 106 and an outlet 108. In some examples, the valve body 102 is the means for defining the fluid flow passageway 104 between the inlet 106 and the outlet 108. A bonnet 110 is coupled to the valve body 102 via fasteners 112 and the bonnet 110 couples the valve body 102 to an actuator 114 (e.g., a pneumatic actuator). Valve trim 116 is disposed within the fluid flow passageway 104 formed via the valve body 102 to control fluid flow between the inlet 106 and the outlet 108. When the bonnet 110 is attached to the valve body 102, the bonnet 110 retains the valve trim within the valve body 102.

The valve trim 116 of the illustrated example includes internal components of the control valve 100 that control fluid flow between the inlet 106 and the outlet 108 and/or provide certain fluid flow characteristics to fluid flowing through the fluid flow passageway 104. The valve trim 116 of the illustrated example includes a closure member 118, a valve seat 120, a cage 122, and a stem 124. The stem 124 operatively couples the closure member 118 to the actuator 114. In the illustrated example, the closure member 118 is depicted as a valve plug having a cylindrical body and a seating surface 126. However, in other examples, the closure member 118 can be a disc, or any other structure sliding stem closure member) to vary the flow of fluid through the control valve 100. The closure member 118 (e a valve plug) of the illustrated example has an outer surface sized to closely fit within the cage 122 so that the closure member 118 is movable or slidable within the cage 122 relative to the valve seat 120. The cage 122 can also facilitate maintenance, removal, and/or replacement of the other components of the valve trim 116.

In operation, the actuator 114 (e.g., a pneumatic actuator) drives the closure member 118 between a closed position at which the seating surface 126 of the closure member 118 is in (e.g., sealing) engagement with the valve seat 120 and a fully open or maximum flow rate position at which the seating surface 126 of the closure member 118 is positioned a distance away from the valve seat 120. Specifically, the closure member 118 of the illustrated example moves relative to the valve seat 120 between a fully closed position and a fully open position to modulate fluid flow through the fluid flow passageway 104 of the valve body 102. Additionally, in the fully closed position, the control valve 100 of the illustrated example allows fluid flow between the inlet 106 and the outlet 108. In other words, the valve trim 116 (e.g., the cage 122, the valve seat 120 and the closure member 118) allows fluid flow between the inlet 106 and the outlet 108 when the closure member 118 (e.g., the seating surface 126) is in (e.g., sealing) engagement with the valve seat 120. Such fluid flow between the inlet 106 and the outlet 108 when the control valve 100 is in the closed position provides a continuous (e.g., a minimum) flow rate to prevent cavitation and/or overheating of a pump upstream from the control valve 100. To provide the minimum flow rate, the cage 122 includes apertures 128 that extend through the body of the cage 122. During operation, when particles are present, some of the particles can clog the apertures 128. This clogging of the apertures 128 is problematic because it can alter the minimum flow rate, increase the maintenance cycles, and/or damage valve trim components.

Figure 2:
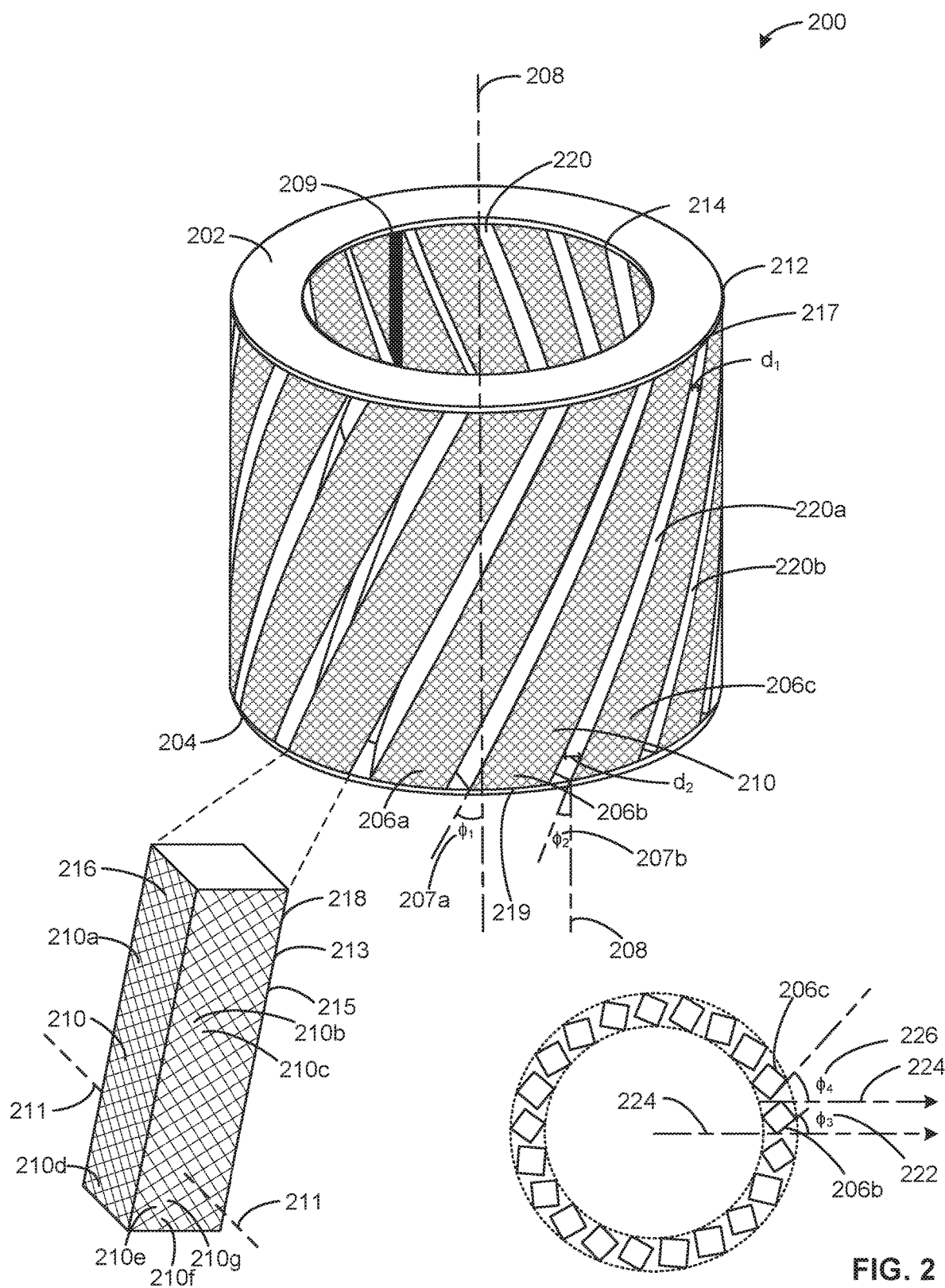
FIG. 2 is an example valve cage implemented in accordance with teachings of this disclosure.

FIG. 2 illustrates an example cage 200 that can be implemented in a control valve such as the control valve 100 of FIG. 1. The cage 200 of the illustrated example has a cylindrically shaped body. However, in other examples, the cage 200 can have any other shape. The cage 200 of the illustrated example is to be positioned in the fluid flow passageway 104 of the valve body 102. The illustrated example includes means for defining the fluid flow passageway 104. In some examples, the means for defining the fluid flow passageway is the cage 200. The example cage 200 has a first end 202 and a second end 204 opposite the first end 202. The cage 200 of the illustrated example includes means for guiding particles. In some examples, the means for guiding particles are columns 206 that extend between the first end 202 and the second end 204. The columns 206 are angled relative to a longitudinal axis 208 of the cage 200. In some examples, a first column 206b is positioned at a first angle 207a relative the longitudinal axis 208, and a second column 206c is positioned at a second angle 207b relative to the longitudinal axis 208 different than the first angle 207a. In some examples, the column 206b is at a third angle 222 relative to a primary fluid flow path 224, and the column 206c is at a fourth angle 226 relative to the primary fluid flow path 224. In some examples, the primary fluid flow path 224 of the cage 200 extends along the longitudinal axis 208 of the cage 200. In some examples, the primary fluid flow path 224 does not extend along and/or align with the longitudinal axis 208. In some examples, the columns 206 can include ribs 209. The ribs 209 are parallel to the longitudinal axis 208 of the cage 200 and are to guide the closure member 118 while traveling between the open position and the closed position relative to the valve seat 120. In some examples, the ribs 209 do not extend along the entire length of the cage 200. For example, the ribs 209 cannot extend along the entire length of the cage 200 when the cage 200 includes a valve seat on an interior surface 214.

In the illustrated example, the columns 206 include means for modulating fluid flow between the inlet 106 and the outlet 108, means for reducing cavitation, and means for attenuating noise. In some examples, the means for modulating fluid flow, the means for reducing cavitation, and the means for attenuating noise are apertures 210 (e.g., fluid flow passageways) that extend from an outer peripheral surface 212 of the columns 206 to the interior surface 214 of the columns 206. In the illustrated example, the columns 206 also include apertures 210 that extend from a third surface 216 to a fourth surface 218. The third surface 216 is positioned between the outer peripheral surface 212 and the interior surface 214 of the column 206. The third surface 216 is opposite the fourth surface 218. As such, each column 206 includes apertures 210 that extend through the column 206 on all sides. In some examples, the column 206 can only include apertures 210 that extend from the outer peripheral surface 212 to the interior surface 214.

The apertures 210 allow fluid flow between the inlet 106 and the outlet 108 of the valve body 102. In the illustrated example, the apertures 210 form a lattice structure. However, the apertures 210 can form any porous geometry (e.g., squares, holes, etc.) and/or be formed by drilling holes or welding of a wire mesh, for example. In some examples, the apertures 210 are sized differently. For example, the aperture 210a can be a different size than aperture the 210b. In some examples, a longitudinal axis 211 that extends through an aperture 210 is non-parallel and/or non-perpendicular relative to the longitudinal axis 208. For example, fluid can enter an aperture 210 located at a first position 213 near the first end 202 of the cage 200 on the interior surface 214 and exit an aperture 210 located at a second position 215 on the peripheral surface 212. The first position 213 located a first distance from the first end 202 and the second position 215 located a second distance from the first end 202, where the second distance is different than the first distance. In some examples, the apertures 210 are non-uniform. As such, a first aperture 210a can have two exit apertures 210b, 210c, while a second aperture 210d can have three exit apertures 210e, 210f, 210g. That is, as fluid enters the first aperture 210a, the fluid can exit one or both of the exit apertures 210b, 210c.

In the illustrated example, the columns 206 are radially spaced about a circumference of the cage 200 to define elongated openings 220 (e.g., fluid flow passageways) between the columns 206. The elongated openings 220 of the illustrated example are angled relative to the longitudinal axis 208. In the illustrated example, a first one of the elongated openings 220a is sized differently than a second one of the elongated openings 220b. The column 206b of the illustrated example is spaced relative to the column 206c. For example, a first end 217 of the column 206b located at the first end 202 of the cage 200 is spaced a first distance (e.g., d1) from the column 206c. A second end 219 of the column 206b located at the second end 204 of the cage 200 is spaced a second distance (e.g., d2) from the column 206c, where the first distance (e.g., d1) is different than the second distance (e.g., d2). During operation, the elongated openings 220 mitigate particles from impinging on the cage 200 by allowing particles to move from one end of the cage 200 along the longitudinal axis 208 until the particles pass through a portion of one of the elongated openings 220.

Figure 3:
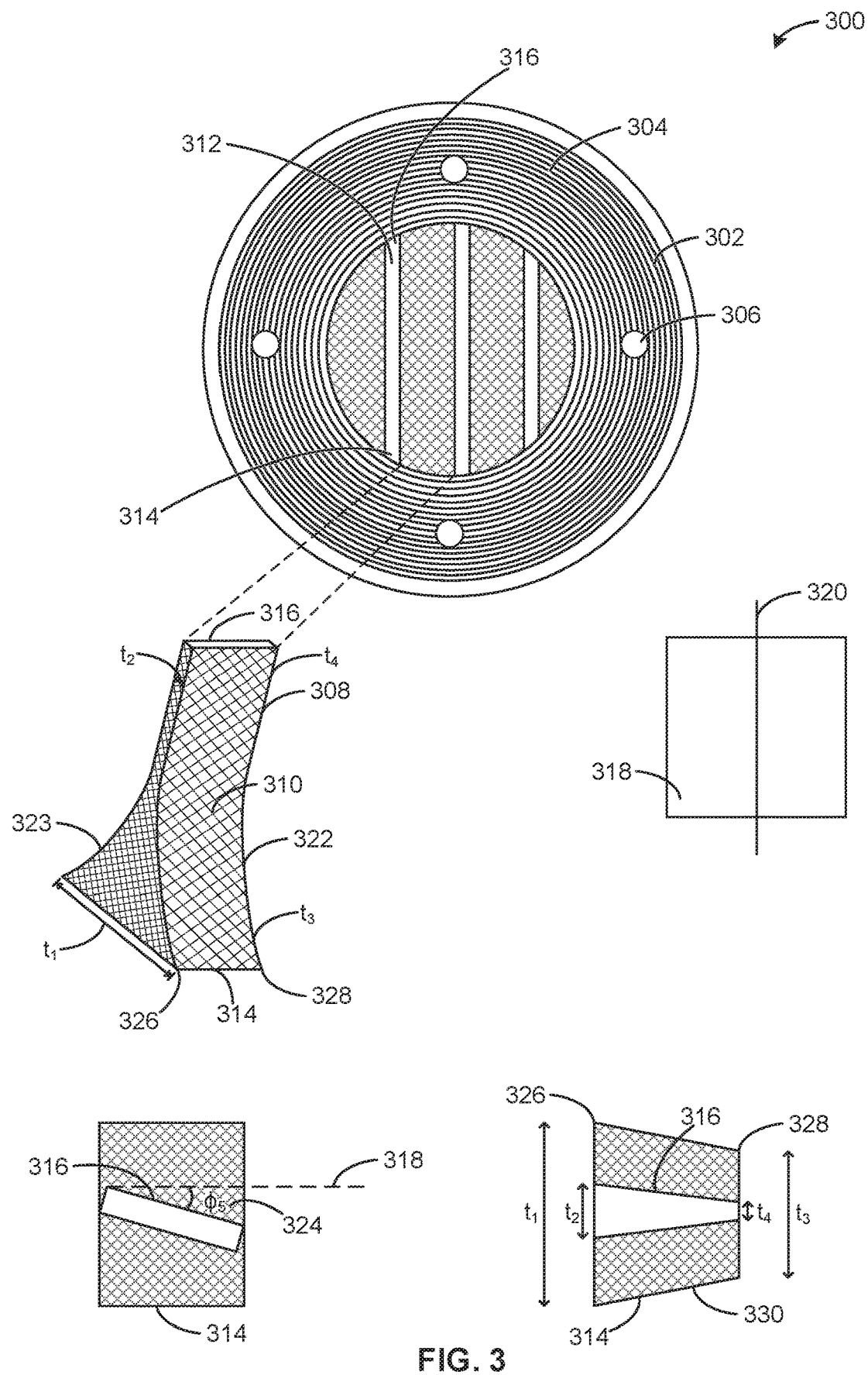
FIG. 3 is an example valve disc implemented in accordance with teachings of this disclosure.

FIG. 3 is an example valve disc 300 that can be implemented to reduce cavitation, noise, etc. in various types of valves and/or piping systems. For example, the disc 300 can be positioned inside the globe of a ball valve. In some examples, the disc 300 can be positioned between pipes. The disc 300 of the illustrated example includes indents 302 that are formed in the surface of the disc 300 to form ridges 304. The ridges 304 can form a seal when the disc 300 is positioned (e.g., compressed) between two pipes, for example. The disc 300 of the illustrated example includes openings 306 that can receive screws or bolts to connect two pipes together. The example disc 300 also includes columns 308 that include apertures 310. The columns 308 are spaced within the disc 300 to form elongated openings 312. The columns 308, the apertures 310, and the elongated openings 312 of the illustrated example are similar to the columns 206, the apertures 210, and the elongated openings 220 of the cage 200 illustrated in FIG. 2. However, in contrast to FIG. 2, the columns 308 and the apertures 310 are angled relative to 1) a surface plane 318 of the disc 300 and/or 2) a second plane 320 that is perpendicular to the surface plane 318. That is, the columns 308 are non-parallel to a surface plane of the disc 300 and non-parallel to the second plane 320 such that the elongated openings 312 are non-uniform (e.g., a first end 314 of the elongated opening 312 is sized differently than a second end 316 of the elongated opening 312).

In the illustrated example, the columns 308 have a first thickness $t_1$ at the first end 314 and a second thickness $t_2$ at the second end 316. In some examples, the first thickness $t_1$ is substantially similar to a thickness of the disc 300, and the second thickness $t_2$ is different than the first thickness $t_1$. As used herein, the term "substantially" implies approximately rather than perfectly. The first thickness $t_1$ and the second thickness $t_2$ are sized such that curved (e.g., concave) surfaces 322, 323 are formed. The curved surfaces 322, 323 of the illustrated example allow particles to move along the columns 308 from the first end 314 to the second end 316. In some examples, the first ends 314 of the columns 308 are at a first angle (e.g., parallel to the surface plane 318) while the second ends 316 of the columns 308 are at a second angle 324 relative to the surface plane 318. That is, the columns 308 can form a twisted shape to allow particles to move along the columns 308 into one of the elongated openings 312, for example. Alternatively, the columns 308 can have the first thickness $t_1$ and the second thickness $t_2$ at a first side 326 of the columns 308, and can have a third thickness $t_3$ and a fourth thickness $t_4$ at a second side 328 of the columns 308. In some examples, the first thickness $t_1$ is larger than the third thickness $t_3$, and the second thickness $t_2$ is larger than the fourth thickness $t_4$. As such, the columns 308 create a second curved surface 330 that extends from a smaller thickness on the second side 328 to a larger thickness on the first side 326. Thus, when particles move along the column 308 from the first end 314 to the second end 316, the particles also move along the column 308 from the first side 326 to the second side 328 until the particles pass through one of the elongated openings 312. As such, the columns 308, the apertures 310, and the elongated openings 312 mitigate particles from impinging on a valve trim by allowing particles to move through the disc 300 without clogging or damaging the disc 300.

Figure 4A:
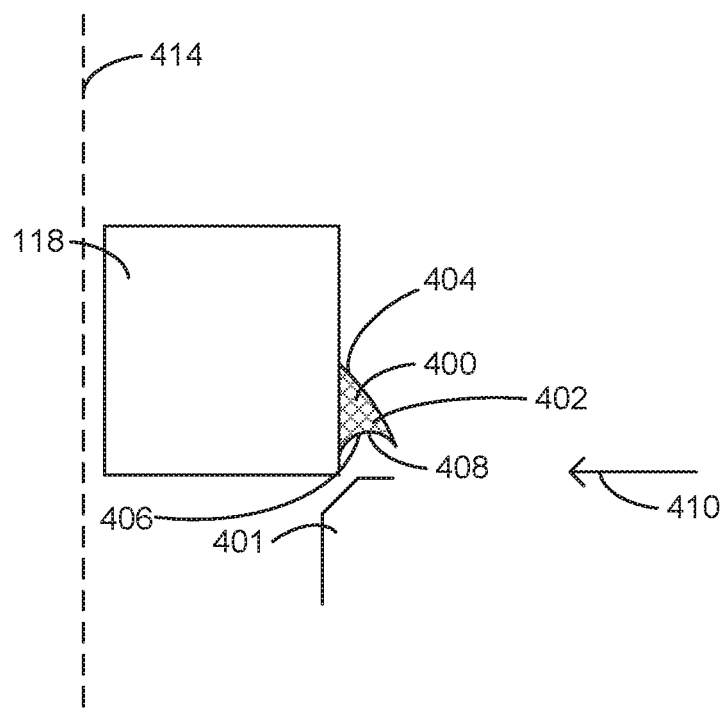
FIGS. 4A-4B are illustrations of a valve plug implemented in accordance with teachings of this disclosure.
Figure 4B:
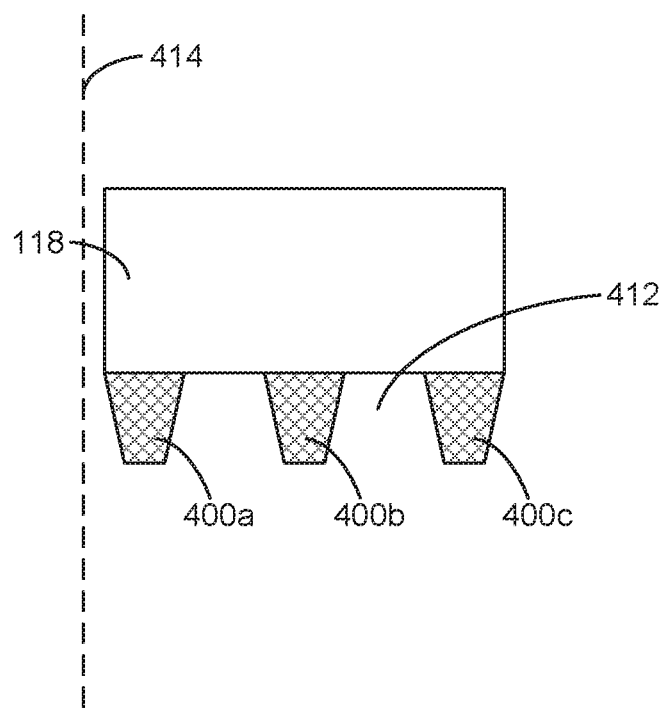

FIGS. 4A-4B are illustrations of the closure member 118 (e.g., valve plug) implemented with an example valve trim apparatus 400 in accordance with teachings of this disclosure. In the illustrated example of FIG. 4A, the closure member 118 is fitted with the valve trim apparatus 400 (e.g., lattice structure) to mitigate particles from damaging a valve seat 401. In the illustrated example, the valve trim apparatus 400 is printed directly on the closure member 118. For example, the valve trim apparatus 400 can be printed onto the closure member 118 using heat molding manufacturing processes or techniques. However, any other method can be used to position the valve trim apparatus 400 on the closure member 118.

The valve trim apparatus 400 of the illustrated examples includes apertures 402 (e.g., fluid flow passageways) that extend from an outer peripheral surface 404 to an interior surface 406. In some examples, the apertures 402 allow fluid flow between the inlet 106 and the outlet 108 of the valve body 102. In the illustrated example, the apertures 402 form a lattice structure. In some examples, the apertures 402 are structured and operate in a similar manner as the apertures 210 illustrated in FIG. 2. In some examples, the valve trim apparatus 400 extends entirely around a circumference of the closure member 118.

In the illustrated example of FIG. 4A, the valve trim apparatus 400 is fitted so an arc 408 is formed to extend past the end of the closure member 118 towards the valve seat 401. As such, during operation, the valve trim apparatus 400 mitigates particles from wearing down or destroying the valve seat 401, reduces cavitation, and attenuates noise by extending the valve trim apparatus 400 into a flow path 410 over the valve seat 401.

In the illustrated example of FIG. 4B, the valve trim apparatus 400 is radially spaced about the circumference of the closure member 118 to form elongated openings 412 (similar to elongated openings 220 illustrated in FIG. 2). In the illustrated example of FIG. 4B, where the valve trim apparatus 400 is radially spaced about the circumference of the closure member 118, the valve trim apparatus 400 can be angled relative to a longitudinal axis 414 to guide particles towards the elongated openings 412. In the illustrated example of FIG. 4B, the valve trim apparatus 400a can be sized and spaced differently than the valve trim apparatus 400b and the valve trim apparatus 400c.

Figure 5:
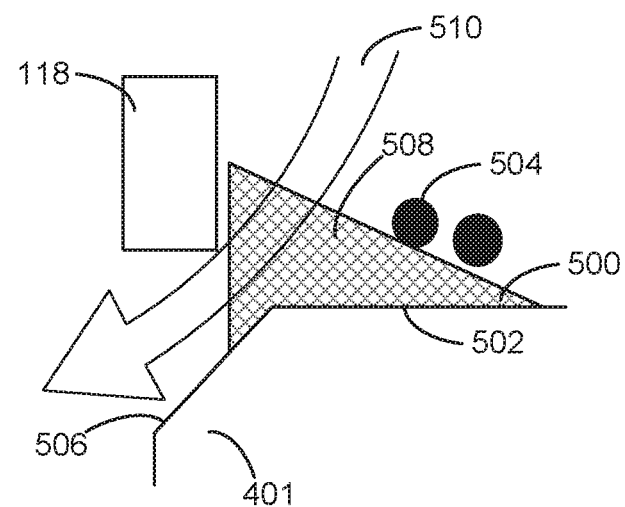
FIG. 5 is an illustration of a valve seat implemented in accordance with teachings of this disclosure.
Figure 5:
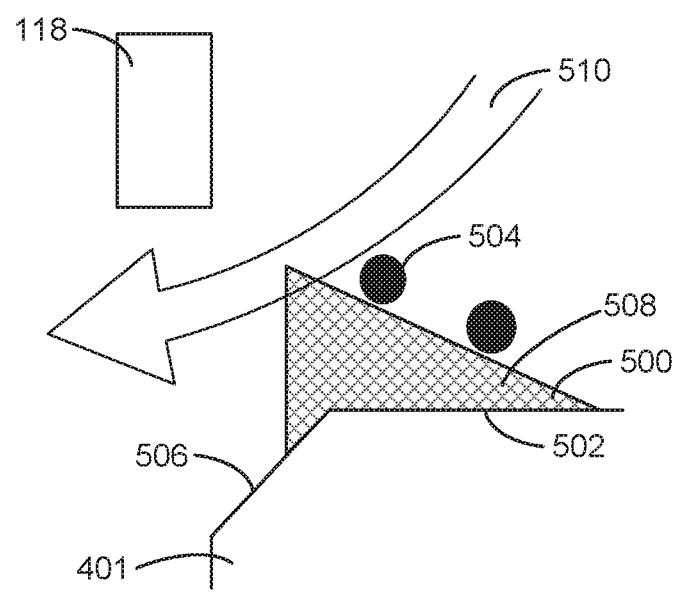

FIG. 5 is an illustration of the valve seat 401 implemented with an example valve trim apparatus 500 in accordance with teachings of this disclosure. The valve trim apparatus 500 of the illustrated example is similar to the valve trim apparatus 400 of FIG. 4. In the illustrated example, the valve trim apparatus 500 is printed directly on the valve seat 401. For example, the valve trim apparatus 500 can be printed onto the valve seat 401 using heat molding manufacturing processes or techniques. However, any other method can be used to position the valve trim apparatus 500 on the valve seat 401. In contrast to the valve trim apparatus 400, the valve trim apparatus 500 is fitted on the valve seat 401 and is angled upwards from a surface 502 of the valve seat 401. As such, during operation, the valve trim apparatus 500 mitigates particles 504 from damaging a contact portion 506 of the valve seat 401 by directing the particles 504 away from the contact portion 506 and into a flow path 510. In some examples, when the closure member 118 is near the contact portion 506, particles 504 can build up near the closure member 118. As such, the closure member 118 can be opened to allow the particles 504 to enter the flow path 510.

The valve trim apparatus 500 of the illustrated example includes apertures 508 (e.g., fluid flow passageways) that extend through the valve trim apparatus 500. In the illustrated example, the apertures 508 form a lattice structure. In some examples, the apertures 508 are structured and operate in a similar manner as the apertures 210 illustrated in FIG. 2 and the apertures 402 illustrated in FIG. 4.

In the illustrated examples of FIGS. 4 and 5, the valve trim apparatus 400, 500 is illustrated on the closure member 118 and the valve seat 401. However, the valve trim apparatus 400, 500 can be formed on/in or positioned on/in any component of the valve trim to mitigate damage to components.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

What is claimed is:

1. An apparatus comprising:
  a cage to be positioned in a fluid flow passageway of a valve body, the cage having a first end and a second end opposite the first end, the cage including columns extending between the first end and the second end, the columns including first ends positioned adjacent the first end of the cage at an angle relative to a primary fluid flow path of the cage, the primary fluid flow path of the cage extends in a first direction perpendicular to a longitudinal axis of the cage, wherein each of the columns includes fluid flow passageways extending through the column from an outer peripheral surface of the column to an interior surface of the column, and wherein the columns are radially spaced about a circumference of the cage body to define elongated openings only between the columns.

2. The apparatus of claim 1, wherein the primary fluid flow path of the cage extends along the longitudinal axis of the cage.

3. The apparatus of claim 1, wherein a first one of the elongated openings between the columns is sized differently than a second one of the elongated openings between the columns.

4. The apparatus of claim 1, wherein each column includes apertures that extend from a third surface to a fourth surface, the third surface between the outer peripheral surface and the interior surface of the column, the third surface opposite the fourth surface.

5. The apparatus of claim 1, wherein the fluid flow passageways through the columns form a lattice structure.

6. The apparatus of claim 1, wherein a first one of the fluid flow passageways through the columns is sized differently than a second one of the fluid flow passageways through the columns.

7. The apparatus of claim 1, wherein at least two of the columns include a rib to guide a valve plug.

8. The apparatus of claim 7, wherein the rib is parallel to the longitudinal axis of the cage.

9. The apparatus of claim 1, wherein the fluid flow passageways through the columns include longitudinal axes that are non-parallel relative to the primary fluid flow path of the cage.

10. An apparatus comprising:
a fluid valve body; and
a cage disposed in the fluid valve body, the cage having a first end and a second end opposite the first end, elongated openings in the cage extending between the first end and the second end, the elongated openings radially spaced and non-parallel to a longitudinal axis of the cage, each of the elongated openings providing a fluid flow path between an interior of the cage and an exterior of the cage, the elongated openings having a first size adjacent the first end and a second size adjacent the second end, the first size different than the second size.

11. The apparatus of claim 10, further including a first column having a first end and a second column having a second end, the first and second columns extending between the first end and the second end, the first end of the first column positioned adjacent to the first end of the cage at an angle relative to a primary fluid flow path of the cage, the primary fluid flow path of the cage extends in a first direction perpendicular to the longitudinal axis of the cage.

12. The apparatus of claim 11, wherein the first end of the first column is spaced a first distance from the second end of the second column at the first end of the cage.

13. The apparatus of claim 12, wherein a third end of the first column is spaced a second distance from a fourth end of the second column at the second end of the cage, the second distance different than the first distance.

14. The apparatus of claim 11, wherein the first column and the second column define one of the elongated openings.

15. The apparatus of claim 11, wherein first column and the second column include one or more fluid flow passageways to allow fluid flow between an inlet and an outlet of the valve body.

16. The apparatus of claim 10, wherein the elongated openings are sized to mitigate particles from impinging on the cage by allowing particles to move from the first end of the cage along the longitudinal axis until the particles pass through a portion of one of the elongated openings.

17. An apparatus comprising:
means for defining a fluid flow passageway between an inlet and an outlet;
means for modulating fluid flow between the inlet and the outlet, the means for modulating fluid flow angled relative to a primary fluid flow path of the means for defining the fluid flow passageway, the primary fluid flow path extends in a first direction perpendicular to a longitudinal axis of the means for defining a fluid flow passageway, the means for modulating fluid flow including an interior surface, an outer peripheral surface opposite the interior surface, a first side surface between the interior surface and the outer peripheral surface, and a second side surface opposite the first side surface, the means for modulating fluid flow including apertures extending through the first side surface to the second side surface.

18. The apparatus of claim 17, wherein the means for modulating fluid flow includes means for reducing cavitation.

19. The apparatus of claim 17, wherein the means for modulating fluid flow includes means for attenuating noise.

20. The apparatus of claim 17, wherein the means for modulating fluid flow includes means for guiding particles.

* * * * *